May 8, 1928. Re. 16,957
T. A. KILLMAN
CAN OPENER
Original Filed July 2, 1925 2 Sheets-Sheet 1
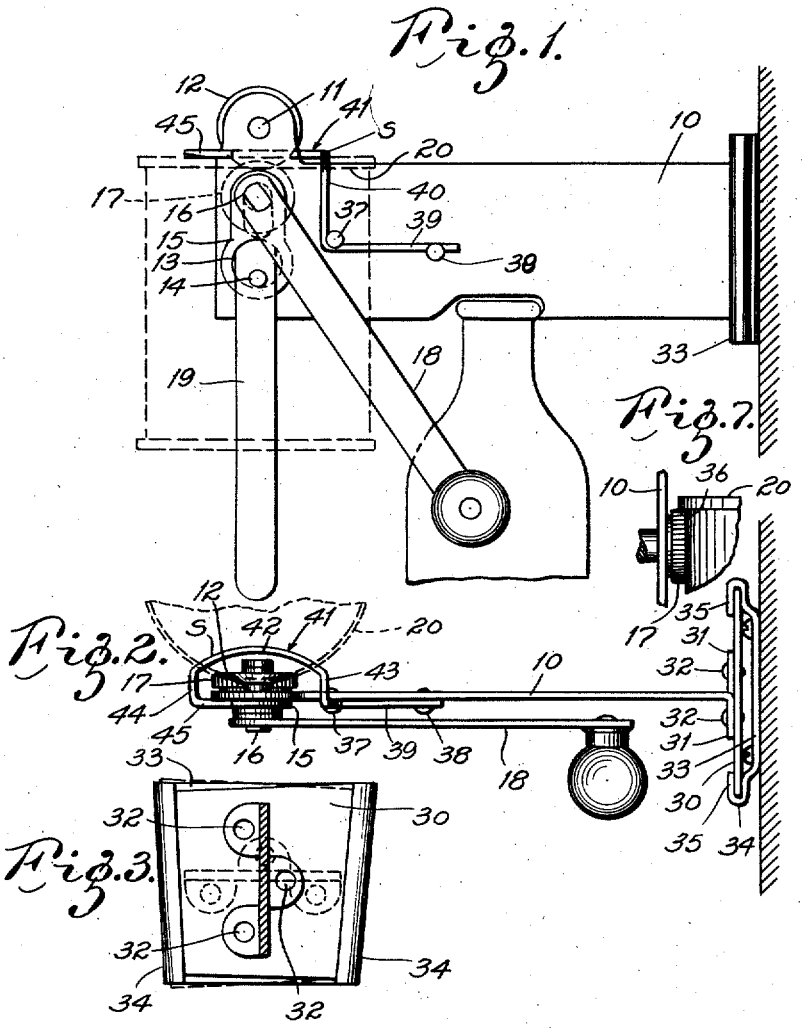
INVENTOR:
THOMAS A. KILLMAN.
BY James L. Hopkins,
ATTORNEY.

May 8, 1928.

Re. 16,957

T. A. KILLMAN

CAN OPENER

Original Filed July 2, 1925 2 Sheets-Sheet 2

INVENTOR:
THOMAS A. KILLMAN
BY James L. Hopkins
ATTORNEY.

Reissued May 8, 1928. Re. 16,957

UNITED STATES PATENT OFFICE.

THOMAS A. KILLMAN, OF NASHVILLE, TENNESSEE, ASSIGNOR TO DAZEY CHURN & MANUFACTURING COMPANY, OF ST. LOUIS, MISSOURI.

CAN OPENER

Original No. 1,581,958, dated April 20, 1926, Serial No. 41,117, filed July 2, 1925. Application for reissue filed August 22, 1927. Serial No. 214,761.

This invention relates to can openers and more particularly to a can opener of that type shown in my co-pending application, Patent #1,558,372, granted October 20th, 1925, for can openers.

In the co-pending application just identified, I have illustrated a can opener having a cutter adapted to engage in the top of a can and a feeding roller adapted to engage under the rim of the can and at the side of the can to cause the can to rotate in engagement with the cutting roller so that the top of the can is severed. This type of can opener is advantageous in that in handling circular cans, it is unnecessary to support the can with the hand during the cutting operation. The feeding roller engaging beneath the rim of the can provides sufficient support and disengagement of this support is prevented by the cutting roller as long as it is in its operative position with relation to the top of the can whether the top of the can be entirely severed or not. It is, however, disadvantageous in that with this type of cutter, if it is to be applied to a fixed support and is not of the dirigible type, it is impossible to employ the device with square cans for the cutter engaging in the top of the can will come into engagement with the walls of the can at the corners thereof preventing the completion of the cutting operation. If it be of the dirigible type, however, the feeding roller can be arranged against the can so that it comes into contact with the inner face of the rim of the can and the cutter engages the top of the can beneath the rim thereof to sever the same. Of course, to operate such a can opener in this manner, the can would ordinarily have to be arranged upon some supporting surface or else it would drop when severed or must be supported by the hand during the cutting operation. Since with the dirigible type of can opener having a rotatable handle, both hands are necessary to the operation of the tool, the services of a second person would be required in the latter instance. Accordingly an important object of this invention is to provide a mounting for a can opener of this type whereby the cutting mechanism may be either vertically arranged for operating upon round cans or horizontally arranged for operating upon the square cans so that the mechanism being supported, one hand of the operator is left free to support cans when the cutter is used in the last position.

Specifically, the invention relates to a novel and improved supporting bracket for the can opener whereby it may be supported in either of the positions above referred to.

A further and important object of the invention is the combination with a structure of the type described above of means for maintaining the engaged can in proper feeding relation to the feeding roller so that the difference between the thickness and height of the can may be compensated for.

These and other objects I attain by the construction shown in the accompanying drawings, wherein for the purpose of illustration is shown a preferred embodiment of my invention and wherein:—

Figure 1 is a side elevation of a can opener and mounting bracket therefor constructed in accordance with my invention in the position in which it is employed for removing the tops of round cans;

Figure 2 is a plan view thereof;

Figure 3 is a sectional view through the support looking toward the bracket with the support shown in full lines in the position illustrated in Figures 1 and 2 and in dotted lines in the position in which it is employed for removing the tops of square cans;

Figure 7 is a detailed view showing the engagement of the feeding roller with the can rim when removing the tops of round cans.

Figure 4:
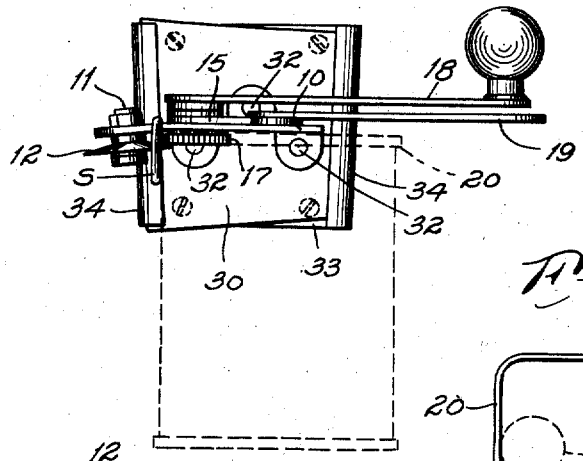
Figure 4 is an end elevation of the can opener in the last named position.
Figure 6:
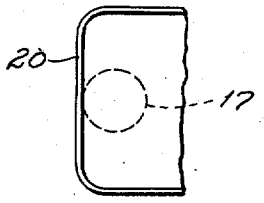
Figure 6 is a view of a portion of the top of a square can showing the feeding roller in position therein.

Referring now more particularly to the drawings in which I have illustrated a can opener constructed in accordance with the disclosure of my prior application, Patent #1,558,372, granted October 20th, 1925, for can openers, the numeral 10 designates a support in which is journaled, as at 11, a cutter roller 12. The support has likewise journaled therein a disk 13, the journal of which is eccentrically disposed, as indicated at 14. This disk is embraced by a yoke 15 engaging the shaft 16 which extends through a slot aligned with the pivot 11 of the cutter roller 12 and which has secured to one end thereof a feeding roller 17 and at the opposite end thereof a handle 18 whereby it may be rotated.

It will be obvious that by rotating the eccentric 13 through its handle 19, the feeding roller may be caused to approach and recede from the cutting roller. In its withdrawn position, a can may be inserted between the feeding and cutting rollers and after such insertion, by shifting the handle 19 to cause the feeding roller to approach the cutting roller, the cutter is forced through the top of the can and the feeding roller brought into engagement with the under surface of the rim 20 of the can. The structure above described is identical with that set forth in my prior application with the exception of the fact that the support 10 of the present application is horizontally directed whereas in said prior application, it is substantially vertically directed. This support 10 consists of a flat sheet of metal and the axes of the cutting and feeding rollers are arranged transversely of this strip whereas in the prior structure, they were arranged longitudinally of the strip. The present illustration further includes a hold-down spring S for the purpose of engaging the can to force the same into engagement with the feeding roller 17.

The mechanism above described is arranged at one end of the strip forming the support 10 and at the opposite end thereof, this strip has attached thereto a base plate or head 30. In the present illustration, the strip 10 is slit intermediate its edges and the portions thus formed are alternately oppositely bent to form feet 31 which are riveted to the head 30, as at 32. The head 30 is in the form of a trapezoid plate, hereinafter to be more fully described.

A wall bracket 33 is provided comprising a plate, the side edges 34 of which converge downwardly and are provided with flanges 35 reverted in spaced relation to the body of the plate to form grooves or guides for receiving the edges of the plate forming the head 30. Opposite side edges of the plate 30 have the same angular pitch or convergence as the convergence of the sides 34 of the wall bracket 33 and accordingly, this plate may be engaged in the wall bracket with the plate forming the support 10 either horizontally or vertically disposed, as illustrated in Figures 3 and 4 respectively. When the plate is horizontally disposed, the cutting roller and feeding roller are arranged beneath the plate so that the cutting roller may be engaged with the can beneath the upper flange thereof to sever the head of the can and the feeding roller will engage against the inner surface of the upstanding rim 20 of the can. When the support 10 is vertically arranged, the cutting roller will engage with the head of the can within the rim 20 and the feeding roller will engage beneath the rim 20 at the outer face of the can, as at 36. In employing a can opener in this way, it is necessary that some compensation be made for the difference in distance between the cutter engaged face of the can and the feeding wheel engaged face thereof for many round top cans have relatively deep rims 20 with the stem well below the surface of the top of the can which is to be removed while in a square can, obviously the thickness of the rim is all that has to be considered and is usually less than the depth between the two faces above mentioned. This difference in size will result in the feeding roller properly engaging the can rim to feed the same to the cutting roller with one type and in the other in such a loose engagement that no feeding would result where the spring S above mentioned is not employed. This spring S serves the combined functions of a guide to prevent oscillation of a can and to force the rim of the can into operative engagement with the feeding roller.

To provide a mounting for the hold-down spring, the support 10 is preferably provided with longitudinally spaced studs 37 and 38. The hold-down spring has a relatively straight portion 39 engaging opposite faces of the studs 37, 38 and an angular portion 40 extending above the upper face of the support. This angular portion has attached thereto a substantially U-shaped portion 41, the bight 42 of which is preferably arcuately curved, as disclosed, and one arm 43 of which provides a continuation of the vertically disposed portion 40 of the hold-down spring. The opposite arm 44 has an inbent and portion 45, the extremity of which engages against the opposite face of the support 10 from the cutting roller 12 so that displacement of the free end of the U is prevented.

Figure 5:
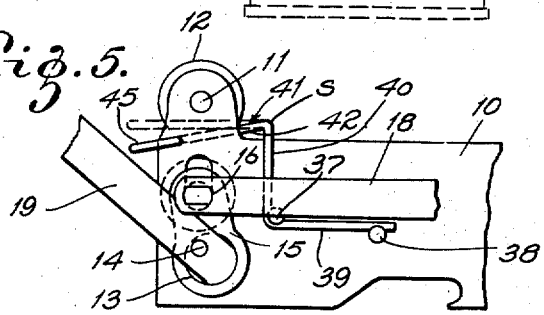
Figure 5 is a view of the can opener in position to receive a can.

This U-shaped portion of the hold-down spring, when in normal position or in that position which it occupies when there is no can positioned in the cutter, inclines downwardly from its point of attachment to the angular portion 40, as shown in Figure 5, to the free end thereof and accordingly offers a slight resistance to the insertion of a can between the feeding and cutting rollers when these rollers are separated to the greatest possible extent. This resistance is, however, very slight. As the handle 19 is manipulated to cause the feeding roller to elevate and the cutter to pass through the top or side of the can, the resistance increases so that when the feeding roller arrives at its feeding or operative position, the tension of the spring is considerable and quite sufficient to provide the necessary tension preventing separation of the feeding roller and rim of the can. This bracket further permits the ready complete removal of the cutting mechanism so that the same may be placed in a drawer or other out of the way spot and the obstruction caused thereby removed. My can opener may be termed a "reversible" can opener in the sense that it has the capacity of being operable to sever the top from a can in either of two positions while the can itself is held in its normal upright position so that it can be properly supported and the contents not spilled.

It will be obvious that this hold-down spring pressing down upon the top of a round can will tend to force the side wall of the can against the face of the feeding roller and thus hold the can against oscillation, in addition to its function of forcing the edge of the rim of the can against the serrated face of the feeding roller. When used with a square can, the spring, by its engagement with the side wall of the cam, causes the head of the can to engage against the under surface of the flat support 10 and thus serves to hold the can against oscillation as well as force the rim of the can into engagement with the feeding roller. This hold-down spring is shown and claimed in my co-pending application for can openers, Patent #1,573,969, granted February 23rd, 1926, and I accordingly do not herein claim this hold-down spring except in combination with the structure of the bracket 33 and its associated part, permitting the use of the can opener for either square or round cans.

It will be obvious that the structure provided for supporting the support 10 in its two positions may be considerably modified and that obviously, the method of supporting the cutter may be applied to other types of cutters than that at present illustrated. I accordingly do not limit myself to such specific structure except as hereinafter claimed.

I claim:—

1. The combination with a can opener including a support, feeding and cutting rollers carried by the support adapted to engage a can at opposite sides of the rim thereof, the axes of said rollers being disposed in a plane at right angles to the longitudinal axis of the support, means for moving one of said rollers toward and away from the other of the rollers and means for rotating the feeding roller, of an attaching bracket for said support to which the support may be selectively secured in either of two positions rotatably spaced ninety degrees about the axis of the support to thereby arrange the rollers in vertical or horizontal planes.

2. The combination with a can opener including a support, feeding and cutting rollers carried by the support adapted to engage a can at opposite sides of the rim thereof, the axes of said rollers being disposed in a plane at right angles to the longitudinal axis of the support, means for moving one of said rollers toward and away from the other of the rollers and means for rotating the feeding roller, of an attaching bracket for said support to which the support may be selectively secured in either of two positions rotatably spaced ninety degrees about the axis of the support to thereby arrange the rollers in vertical or horizontal planes including a wall bracket having opposed downwardly converging channels, and a trapezoidal head carried by said support for engagement in said channel, opposed side edges of the head having the same convergence as the channels of said wall bracket.

3. In a can opener, a wall bracket, a support associated with the wall bracket and securable thereto in positions rotatably spaced ninety degrees apart, feeding and cutting rollers carried by the support and having their axes arranged in a plane at right angles to the support, means for adjusting one of said rollers toward and away from the other of the rollers and means for rotating the feeding roller.

4. The combination with a can opener including a support, feeding and cutting rollers carried by the support adapted to engage a can at opposite sides of the rim thereof, the axes of said rollers being disposed in a plane at right angles to the longitudinal axis of the support, means for moving one of said rollers toward and away from the other of the rollers, means for rotating the feeding roller, of an attaching bracket for said support to which the support may be selectively secured in either of two positions rotatably spaced ninety degrees about the axis of the support to thereby arrange the rollers in vertical or horizontal planes and a yieldable guide associated with said rollers engaging a can positioned between the rollers in either position of the support to force the rim of the can into operative engagement with the feeding roller.

5. In combination with a can opener including feeding and cutting rollers, means for moving one of said rollers toward and away from the other of the rollers, means for rotating the feeding roller, a wall bracket, a support for said rollers, means for selectively securing the support to the bracket with said rollers horizontally or vertically disposed.

6. In combination with a can opener including feeding and cutting rollers, means for moving one of said rollers toward and away from the other of the rollers, means for rotating the feeding roller, a wall bracket, a support for said rollers, means for selectively securing the support to the bracket with said rollers horizontally or vertically disposed and means operative in either of said positions for yieldably forcing a can engaged between the rollers into operative engagement with the feeding roller.

7. The combination with a can opener including a support, feeding and cutting rollers carried by the support adapted to engage a can at opposite sides of the rim thereof, the axes of said rollers being disposed in a plane at right angles to the longitudinal axes of the support, means for moving one of said rollers toward and away from the other of the rollers and means for rotating the feeding roller, of a wall bracket, the head of said support engageable with the bracket in either of two positions, said rollers in one of said positions being horizontally disposed and in the other of said positions being vertically disposed.

8. The combination with a can opened including a support, feeding and cutting rollers carried by the support adapted to engage a can at opposite sides of the rim thereof, the axes of said rollers being disposed in a plane at right angles to the longitudinal axis of the support, means for moving one of said rollers toward and away from the other of the rollers and means for rotating the feeding roller, of an attaching bracket for said support to which the support may be selectively secured in either of two positions rotatably spaced ninety degrees about the axis of the support to thereby arrange the rollers in vertical or horizontal planes, said bracket comprising a plate having downwardly converging side edges, said side edges having portions reverted in spaced relation to the plate to thereby provide guides, the support having a head comprising a trapezoidal plate opposite side edges of which converge with the same degree of convergence as the side edges of the wall bracket.

9. The combination with a reversible can opener including means for severing the top of a can in either position of the opener of a support; a wall bracket comprising a plate having opposite side edges converging downwardly and provided with flanges reverted in spaced relation to the body of the plate to form converging grooves; and a base plate mounted on one end of said support and provided with opposite side edges having the same angular pitch or convergence as the said grooves.

10. A reversible can opener including means for severing the top of a can in either position of the opener and provided with a wall mounting comprising a machine support; a plate with tapered side edges fixed on the end of said support; and a wall bracket having two converging grooves for the reception of said plate.

In testimony whereof I affix my signature.

THOMAS A. KILLMAN.